United States Patent [19]

Lesea et al.

[11] Patent Number: 5,175,475
[45] Date of Patent: Dec. 29, 1992

[54] HIGH-PASS T-NETWORKS WITH INTEGRAL TRANSFORMER FOR GASEOUS DISCHARGE LAMPS

[75] Inventors: Ronald A. Lesea, Redwood City; John B. Sampson, Morgan Hill, both of Calif.

[73] Assignee: GTE Products Corporation, Danvers, Miss.

[21] Appl. No.: 802,245

[22] Filed: Dec. 4, 1991

Related U.S. Application Data

[62] Division of Ser. No. 700,628, May 15, 1991, which is a division of Ser. No. 443,588, Nov. 29, 1989, Pat. No. 5,047,691.

[51] Int. Cl.$^5$ ............................................. H05B 37/00
[52] U.S. Cl. ...................... 315/244; 315/209 R; 315/DIG. 7
[58] Field of Search ............. 315/244, 209 R, 227 R, 315/219, DIG. 5, DIG. 7

[56] References Cited

U.S. PATENT DOCUMENTS

| | | | |
|---|---|---|---|
| 4,207,497 | 6/1980 | Capewell | 315/244 |
| 4,398,156 | 8/1983 | Aaland | 315/244 |
| 4,415,839 | 11/1983 | Lesea | 315/209 R |
| 4,633,141 | 12/1986 | Weber | 315/244 |
| 4,904,905 | 2/1990 | Olon | 315/244 |
| 5,021,716 | 6/1991 | Lesea | 315/219 |
| 5,028,846 | 7/1991 | Lesea | 315/244 |
| 5,084,652 | 1/1992 | Kakitani | 315/DIG. 7 |

*Primary Examiner*—Eugene R. LaRoche
*Assistant Examiner*—A. Zarabian
*Attorney, Agent, or Firm*—Thomas E. Schatzel

[57] ABSTRACT

For coupling one, or more, gaseous discharge lamps to a high-frequency AC power-source a ballasting (current-limiting) network employs a first capacitor, a second inductor, and a transformer having a primary winding coupled to the high-frequency AC power-source by the first capacitor and a secondary winding coupled to the gaseous discharge lamp by the second inductor.

4 Claims, 3 Drawing Sheets

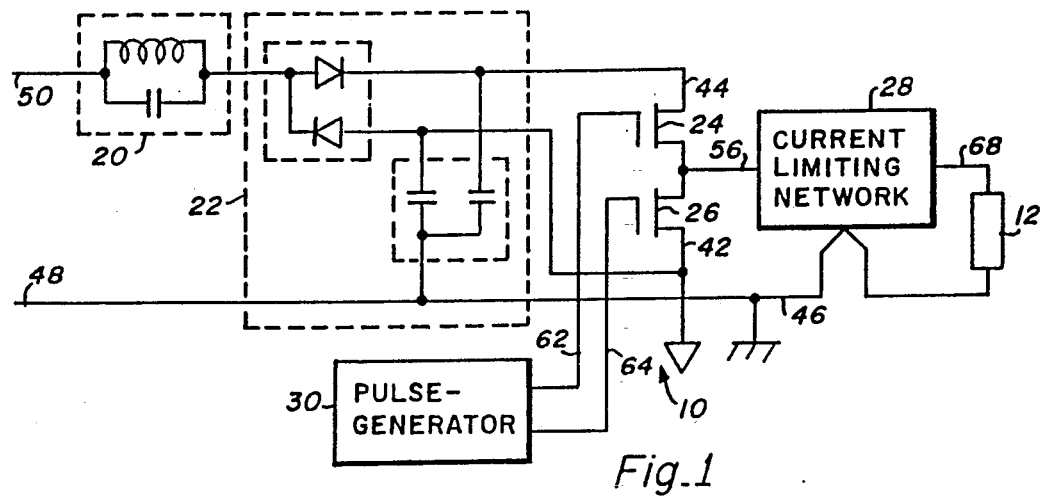
Fig_1
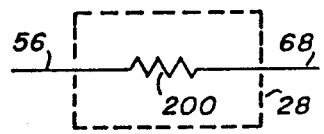
Fig_2A
(PRIOR ART)
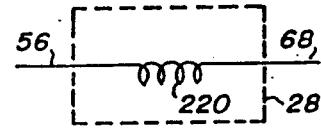
Fig_2B
(PRIOR ART)
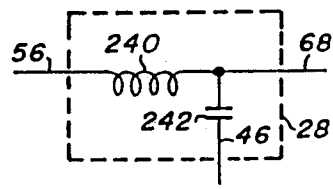
Fig_2C
(PRIOR ART)
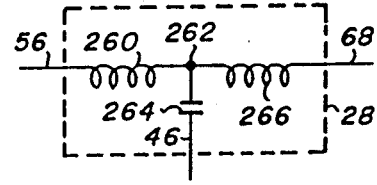
Fig_2D
(PRIOR ART)
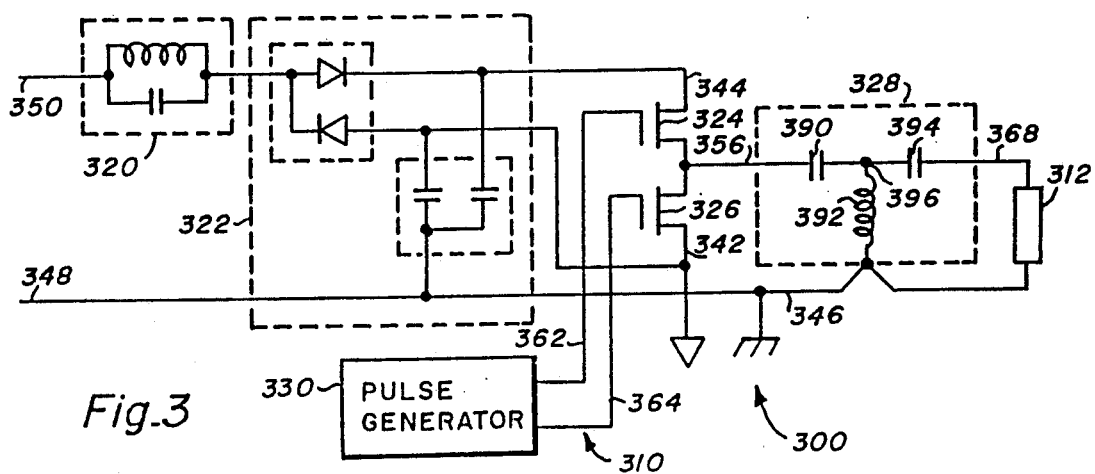
Fig_3

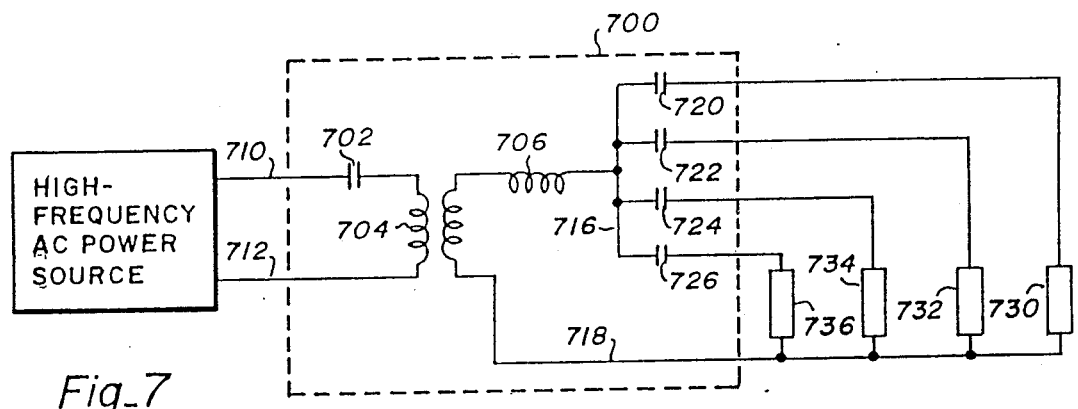
Fig_7
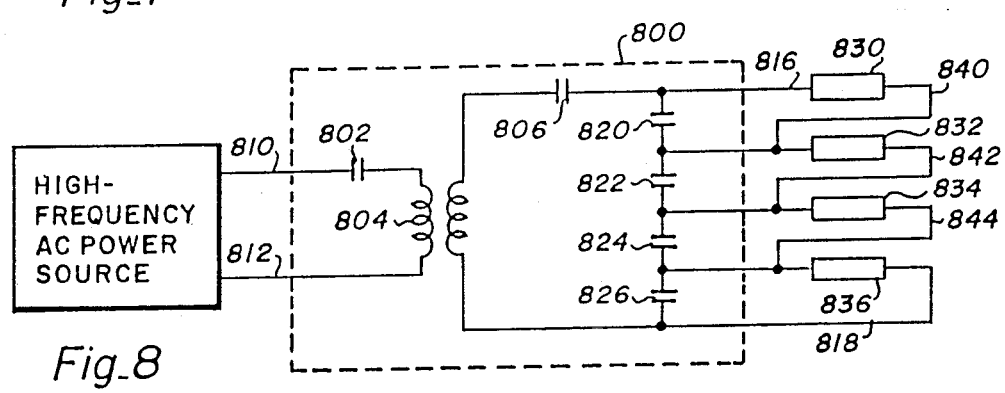
Fig_8
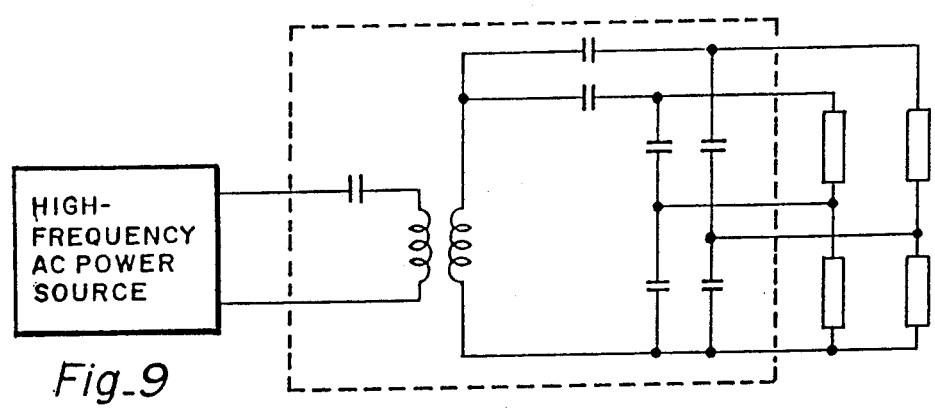
Fig_9
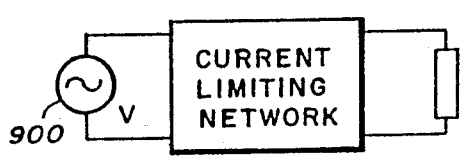
Fig_10A
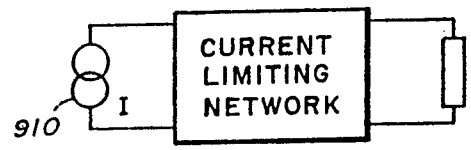
Fig_10B

HIGH-PASS T-NETWORKS WITH INTEGRAL TRANSFORMER FOR GASEOUS DISCHARGE LAMPS

This is a divisional of copending Ser. No. 07/700,628 filed on May 15, 1991, which is a divisional of U.S. application Ser. No. 07/443,588 filed on Nov. 29, 1989 now U.S. Pat. No. 5,047,691, issued Sep. 10, 1991.

TECHNICAL FIELD

The present invention relates to ballasts for gaseous-discharge lamps generally and more particularly to a safe ballasting network.

BACKGROUND ART

A ballast (at least as the term is used herein) is something which is employed to limit the level of a current through a gaseous-discharge lamp. For example, an inductor functions as a ballast when the inductor is connected in series with a fluorescent lamp across a 120 volt, 60 Hz, AC power line. Although satisfactory for many applications, this combination is less than ideal. For one thing, such a combination presents a less than ideal power factor to the AC power line. In addition, at 60 Hz, inductors (of any reasonable size) dissipate a relatively large amount of power generating a relatively large amount of heat. Further, fluorescent lamps operate more efficiently when driven from a high-frequency source of AC power, such as, for example, the AC power source which is disclosed in the U.S. Pat. No. 4,415,839 of Ronald A. Lesea, entitled "Electronic Ballast For Gaseous Discharge Lamps."

Portions of the above-mentioned ballast are illustrated (herein) in FIG. 1 of the drawing generally designated by the number 10. Illustrated with ballast 10 is a (load that employs at least one) gaseous discharge lamp, which is designated 12. Ballast 10 is shown to employ a power-factor-correcting network 20; a DC power supply 22; a pair of switches (transistors), which are respectively designated 24 and 26; a current-limiting network 28; and a pulse generator 30. DC power supply 22 is of a voltage-doubler type which develops two DC potentials with respect to a "reference" potential level that is developed on a line 42. DC power supply 22 develops on a "DC power-supply line" 44 a (twice peak) potential level and on a lamp "return" line 46 a potential level one half the line 44 potential level. To improve the power factor DC power supply 22 presents to an AC power line (by restricting the amount of power the DC power supply can obtain from the AC power line during peaks of the line cycle), the DC power supply is connected in series with power-factor-correcting network 20 across a 120 volt, 60 Hz, AC power line, which is represented by a "neutral" line 48 and a "hot" line 50. Switches (transistors) 24 and 26 are connected in a totem-pole configuration in which the channels of the transistors are connected in series between DC power-supply line 44 and reference line 42. In other words, the channel of switch (transistor) 24 is configured with one end of the channel connected to line 44 and with the other end of the channel connected to a ("high-frequency AC power-source") line 56; and, the channel of switch (transistor) 26 is configured with one end of the channel connected to line 56 and with the other end of the channel coupled (by a resistor, not shown) to line 42. The gates of switches (transistors) 24 and 26 are each coupled by a respective one of two lines, designated 62 and 64, to pulse generator 30. (In one embodiment) pulse generator 30 is configured to drive the switches (transistors), in turn, so as to develop on line 56, a source of high-frequency AC power, the waveform of which approximates a square wave. Lamp (load) 12 is coupled by current-limiting network 28 between high-frequency AC power-source line 56 and return line 46. Specifically, current-limiting network 28 is connected between line 56 and a line 68; and, lamp (load) 12 is connected between lines 68 and 46. (As will become apparent shortly, in some embodiments, current-limiting network 28 is also connected to return line 46.)

For purposes of discussion, for a moment, assume that lamp 12 includes but a single fluorescent lamp of the (four-foot long) type which is commonly designated F40T12 (fluorescent, 40-watt, tubular, twelve-eighths-inch diameter). Normally, an F40T12 lamp requires a potential level (voltage drop) of approximately 200 volts for ignition and operates with a current level of approximately 0.4 amperes (at 60 Hz), developing a voltage drop of approximately 100 volts. Also, for a moment, assume, to ignite the lamp, that ballast 10 develops on line 56 a source of high-frequency AC power having a peak potential level (which, for a square wave, is the same as the RMS potential level) of 200 volts (somewhat more than the 140 volts actually developed). To limit the level of the current through lamp 12, first, assume, that current-limiting network 28 of ballast 12 (shown in FIG. 1) includes but a simple series resistor 200, as is illustrated in (prior art) FIG. 2A. Assume, to limit the level of the current through lamp 12 to 0.4 amperes, that resistor 200 has a resistance of 250 ohms, dropping 100 volts of the 200 volts developed on high-frequency AC power-source line 56. Then, as a consequence, resistor 200 would dissipate, as heat, 40 watts of power. Further, as a consequence, ballast 10 (shown in FIG. 1) would be required to provide 80 watts of power. Obviously, such a ballast (network) would not be very efficient.

Next, to limit the level of the current through lamp 12, assume that current-limiting network 28 of ballast 10 (shown in FIG. 1) includes but a simple series inductor 220, as is illustrated in (prior art) FIG. 2B. Assume, to limit the level of the current through lamp 12 to 0.4 amperes, that inductor 220 has a reactance of 380 ohms (at the square-wave fundamental frequency). (Since the voltages are in phase quadrature, the level of the voltage drop developed across inductor 220 is equal to the square root of 182 volts (the Fourier-adjusted level of the voltage (200 volts assumed) developed on high-frequency AC power-source line 56) squared minus 100 volts (the level of the voltage drop developed across lamp 12) squared, which equals approximately 152 volts. The reactance of inductor 220 is equal to 152 volts (the level of the voltage drop developed across the inductor) divided by 0.4 amperes (the level of the current), which equals approximately 380 ohms.) In this case, ballast 10 would be required to provide 80 VA into a load which is highly inductive. (Of course, inductor 220 stores, rather than dissipating as heat, in this case, approximately, 61 VA (152 volts times 0.4 amperes.) Another disadvantage of using but a simple series inductor (220) for current-limiting network 28 is that the inductor must be relatively large in order to handle the 61 VA. Yet another disadvantage is that the switches (transistors) must have the "generating capacity" to "generate" the total VA. The relatively high current level (0.4 amperes) through the effective (drain-to-source) "on resistance" of the switches (transistors) 24 and 26 results in a relative high power dissipation level in the transistors. As a consequence, ballast 10 would not only be relatively inefficient, but would require relatively efficient (large and expensive) heat sinks. (The effective transistor on resistance may be reduced by using (larger and) more expensive transistors.) (In the U.S. Pat. No. 4,684,850 of C. Stevens, a current-limiting network (ballast) including but a simple series inductor is shown, in FIGS. 4 and 5, designated 53. A current-limiting network (ballast) including but simple series capacitors (one for each of several lamps) is shown in the U.S. Pat. No. 4,613,796 of D. Bay, designated 57.)

Illustrated in (prior art) FIG. 2C, is a current-limiting network that includes an inductor 240 connected between high-frequency AC power-source line 56 and line 68 and a capacitor 242 connected between line 68 and return line 46. Such a current-limiting network, which is referred to herein as a "low-pass" "L-C" or "L-section" network, is useful in that it may be used to provide an impedance transformation, providing a relatively high impedance to lamp 12 while providing a relatively low impedance at, or near, a zero degree phase angle, to switches (transistors) 24 and 26, reducing the level of the current through the transistors. (Such a "low-pass" "L-C" or "L-section" current-limiting network (ballast) is shown, designated 65 and 63 in FIG. 3, of the U.S. Pat. No. 4,370,600 of Z. Zansky and, designated, "L" and "C" in FIG. 1 of the U.S. Pat. No. 4,346,332 of J. Walden. Further, such a network is used in conjunction with a step-up auto-transformer in the U.S. Pat. Nos. 4,532,456 and 4,525,649 of W. Knoll et al. The '456 network drives a single lamp; and, the '649 network drives multiple lamps.) Further, such a current-limiting network is useful in that it may be used to provide a "resonant rise" for starting lamp 12. (For example, if inductor 240 had a reactance of j200 ohms and if capacitor 242 had a reactance of −j300 ohms (both at the square-wave fundamental frequency), the delta (difference) would be 100 ohms and there would be a net three times voltage rise across capacitor 242.) (Protection for the components of an L-section current-limiting network (ballast) at resonance is the subject of a number of the series of United States patents of O. Nilssen, including U.S. Pat. No. 4,461,980.)

Finally, illustrated in (prior art) FIG. 2D, is a current-limiting network that includes an inductor 260 connected between high-frequency AC power-source line 56 and a node 262, a capacitor 264 connected between node 262 and return line 46, and another inductor 266 connected between node 262 and line 68. Such a current-limiting network, which is referred to herein as a "low-pass" "L-C-L" or "T-section" network, is useful in that it provides an extra degree of "design freedom" not provided by the current-limiting network shown in FIG. 2C. (Such a "low-pass" "L-C-L" or "T-section" current-limiting network (ballast) is shown in the U.S. Pat. Nos. 4,358,712 of L. Filgas, Jr. et al; 4,544,863 of K. Hashimoto; 4,277,728 of C. Stevens; and 4,641,061 of R. Munson. The components (L, C, and L, respectively) of the current-limiting networks are designated 10, 12, and 18 in FIG. 1 of the L. Filgas, Jr. et al patent; "L," "C2," and "C1" in FIG. 4 of the K. Hashimoto patent; 47, 46, and 45 in FIG. 4A of the C. Stevens patent; and L1, C1, and C4 (L2, C2, and C5 or L3, C3, and C6) in the R. Munson patent.

It is important to note that the networks illustrated in FIGS. 2B-D provide attenuation of the level of the harmonics of the square-wave frequency. As a consequence, the waveform of the "high-frequency AC power" actually driving lamp(s) 12 is much closer to a sinusoidal wave rather than a square wave.

The above mentioned ballasts are disadvantageous in that they provide little isolation from the AC power line. As a consequence, the above mentioned ballasts may pose a safety hazard (danger of electrocution) to all who come in contact there with.

DISCLOSURE OF THE INVENTION

It is therefore the primary object of the present invention to provide a gaseous-discharge-lighting system which is safe.

Another object of the present invention is to provide a gaseous-discharge-lighting system which is relatively efficient.

Still another object of the present invention is to provide a gaseous-discharge-lighting system which is relatively inexpensive.

Yet another object of the present invention is to provide a network which presents a relatively high power factor to a high-frequency AC power source.

A further object of the present invention is to provide a safe ballasting network which is relatively efficient and relatively inexpensive.

Briefly, for coupling one, or more, gaseous discharge lamps to a high-frequency AC power-source the presently preferred embodiment of a ballasting network in accordance with the present invention employs a first capacitor, a second capacitor, and a transformer having a primary winding coupled to the high-frequency AC power-source by the first capacitor and a secondary winding coupled to the gaseous discharge lamp by the second capacitor.

These and other objects of the present invention will no doubt become apparent to those skilled in the art after having read the detailed description of the presently preferred embodiment of the present invention which is illustrated in the figures of the drawing.

BRIEF DESCRIPTION OF THE FIGURES IN THE DRAWINGS

FIG. 1 is a schematic diagram of a portion of the "Electronic Ballast For Gaseous Discharge Lamps" disclosed in the above-mentioned U.S. Pat. No. 4,415,839 of Ronald A. Lesea.

FIG. 2A (prior art) is a schematic diagram of a simple resistor for use in one embodiment of the ballasting network shown in FIG. 1.

FIG. 2B (prior art) is a schematic diagram of a simple inductor for use in another embodiment of the ballasting network shown in FIG. 1.

FIG. 2C (prior art) is a schematic diagram of a low-pass L-C (L-section) network for use in still another embodiment of the ballasting network shown in FIG. 1.

FIG. 2D (prior art) is a schematic diagram of a low-pass L-C-L (T-section) network for use in yet another embodiment of the ballasting network shown in FIG. 1.

FIG. 3 is a schematic diagram of a gaseous-discharge-lighting system in accordance with the present invention.

Figure 4:
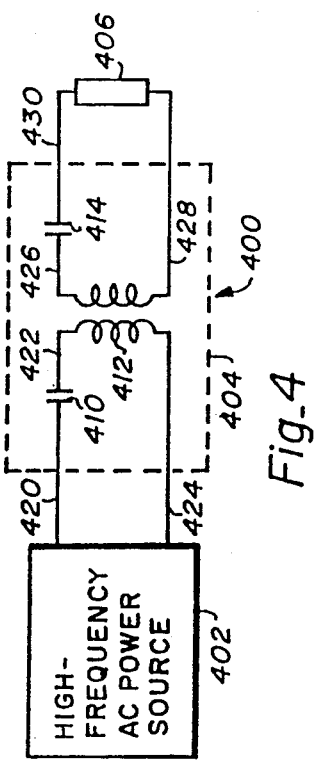
FIG. 4 is a schematic diagram of the presently preferred embodiment of a gaseous-discharge-lighting system in accordance with the present invention.

FIGS. 6A–D are schematic diagrams of Q-enhanced variations of the current-limiting network shown in FIG. 4.

FIG. 7 is a schematic diagram of a gaseous-discharge-lighting system in accordance with the present invention configured to drive the parallel combination of multiple gaseous discharge lamps.

FIG. 8 is a schematic diagram of a gaseous-discharge-lighting system in accordance with the present invention configured to drive the "quasi-parallel" combination of multiple gaseous discharge lamps.

FIG. 9 is a schematic diagram of a combination of the gaseous-discharge-lighting systems shown in FIGS. 7 and 8.

FIG. 10A is a block diagram of a current-limiting network in accordance with the present invention driven by a high-frequency AC power source which appears to the network as a voltage source.

FIG. 10B is a block diagram of a current-limiting network in accordance with the present invention driven by a high-frequency AC power source which appears to the network as a current source.

BEST MODE FOR CARRYING OUT THE INVENTION

Illustrated in FIG. 3 of the drawing generally designated by the number 300 is one embodiment of a gaseous-discharge-lighting system in accordance with the present invention. Preferably, except as noted below, gaseous-discharge-lighting system 300 uses a portion of the "Electronic Ballast For Gaseous Discharge Lamps" which is disclosed in the above-mentioned U.S. Pat. No. 4,415,839 of Ronald A. Lesea and which is illustrated in FIG. 3 generally designated 310. In addition, gaseous-discharge-lighting system 300 uses a (load that employs at least one) gaseous discharge lamp, which is designated 312. Ballast 310 is shown to employ a power-factor-correcting network 320; a DC power supply 322; a pair of switches (transistors), which are respectively designated 324 and 326; a current-limiting network 328; and a pulse generator 330. DC power supply 322 is, preferably, of a voltage-doubler type which develops two DC potentials with respect to a "reference" potential level that is developed on a line 342. DC power supply 322 develops on a "DC power-supply line" 344 a (twice peak) potential level and on a "return" line 346 a potential level one half the line 344 potential level. To improve the power factor DC power supply 322 presents to an AC power line (by restricting the amount of power the DC power supply can obtain from the AC power line during peaks of the line cycle), the DC power supply is connected in series with power-factor-correcting network 320 across a 120 volt, 60 Hz, AC power line, which is represented by a "neutral" line 348 and a "hot" line 350. Switches (transistors) 324 and 326 are connected in a totem-pole configuration in which the channels of the transistors are connected in series between DC power-supply line 344 and reference line 342. In other words, the channel of switch (transistor) 324 is configured with one end of the channel connected to line 344 and with the other end of the channel connected to a ("high-frequency AC power-source") line 356; and, the channel of switch (transistor) 326 is configured with one end of the channel connected to line 356 and with the other end of the channel coupled (by a resistor, not shown) to line 342. The gates of switches (transistors) 324 and 326 are each coupled by a respective one of two lines, designated 362 and 364, to pulse generator 330. (In one embodiment) pulse generator 330 is configured to drive the switches (transistors), in turn, so as to develop on line 356, a source of high-frequency AC power, the waveform of which approximates a square wave. Load (lamp) 312 is coupled, by current-limiting network 328 between high-frequency AC power-source line 356 and return line 346. Specifically, current-limiting network 328 is connected to high-frequency AC power-source line 356, return line 346, and a line 368; and, load (lamp) 312 is connected between line 368 and (in this embodiment) return line 346.

Unlike the network disclosed in the above-mentioned U.S. Pat. No. 4,415,839 of Ronald A. Lesea, in this embodiment, current-limiting network 328 includes a capacitor 390 an inductor 392, and another capacitor 394, all connected in what is referred to herein as a "high-pass" "C-L-C" or "T-section" configuration (network). Specifically, capacitor 390 is connected between high-frequency AC power-source line 356 and a node 396; inductor 392 is connected between node 396 and return line 346; and, capacitor 394 is connected between node 396 and line 368. Current-limiting network 328 is operative to provide an impedance transformation, providing a relatively high impedance to load (lamp) 312 while providing a relatively low impedance at, or near, a zero degree phase angle, to switches (transistors) 324 and 326, reducing the level of the current through the transistors. Further, current-limiting network 328 is useful in that it may provide an increased starting potential across load (lamp) 312.

In addition, capacitors 390 and 394 provide "DC blocking." As a consequence it is not necessary that DC power supply 322 provide a (half-level potential on) return line 346. Current-limiting network 328 and load (lamp) 312 can be connected to, for example, reference-potential line 342.

Preferably, the components of current-limiting network 328 have component values calculated in accordance with the following formulas:

$$Rm = ((Eout/Ein)^2 * Rin * (Rin + R1) - 2 * Eout * Rin * R1/Ein)/(((Eout/Ein)^2 * Rin) - R1);$$
$$Qin = ((Rm/Rin) - 1)^{\frac{1}{2}};$$
$$Qout = ((Rm/R1) - 1)^{\frac{1}{2}};$$
$$Xc(390) = -Rin * ((Rm/Rin) - 1)^{\frac{1}{2}};$$
$$Xc(394) = -R1 * ((Rm/R1) - 1)^{\frac{1}{2}};$$
$$Xl(392) = Rm/(((Rm/Rin) - 1)^{\frac{1}{2}} + ((Rm/R1) - 1)^{\frac{1}{2}});$$
$$Eout = Ein * X1(392)/(Xc(390) + X1(392)); \text{ and,}$$
$$Xin = X1(392) + Xc(390).$$

Where:

Ein is the RMS output voltage level which is developed by the high-frequency AC power-source (between lines 356 and 346). The high-frequency AC power-source disclosed in the above-mentioned U.S. Pat. No. 4,415,839 of Ronald A. Lesea develops a worst case RMS output voltage level of approximately 100 volts. (When connected to a 120 volt, 60 Hz power line, power-factor-correcting network 320 restricts the level of the (twice peak) potential level developed on line 344 to a potential level of approximately 280 volts. Allowing for low line conditions and Fourier losses, yields a line 356 RMS output voltage level of approximately 100 volts.)

Eout is the desired RMS open-circuit output voltage level which is to be developed across load (lamp(s)) 312 (between lines 368 and 346) before the lamp(s) ignite.

Rl is the loaded lamp impedance obtained by dividing the number representing the level of the voltage developed across the lamp(s) at the desired operating current by the number representing the lamp operating current. The series combination of two F40T12 lamps operating at a current level of 0.3 amperes has a loaded lamp impedance of approximately 700 ohms. (The lower lamp current is used because of the improved lamp efficacy at high frequencies.)

Rin is the input impedance which is to be presented by current-limiting network 328 to the high-frequency AC power-source (between lines 356 and 346) to yield the desired lamp power level. In other words, Rin is equal to the square of the value representing Ein divided by the value representing the desired lamp power. For a high-frequency AC power-source (which appears to the current-limiting network as a "voltage source") delivering an RMS output voltage level of 130 volts and for a lamp power of 65 watts, an input impedance of 250 ohms is used.

Rm is a dependent variable, a unique solution for which is defined by the above equations given Ein, Eout, Rl, and Rin.

Qin is the resultant loaded L-section input Q presented by current-limiting network 328 to the high-frequency AC power-source (between lines 356 and 346). It should be noted that for the embodiment of current-limiting network (328) shown in FIG. 3, no independent control of the input Q is available.

Qout is the resultant loaded L-section output Q presented by current-limiting network 328 to load (lamp(s)) 312 (between lines 368 and 346).

Xc(390) is the resultant capacitive reactance of capacitor 390.

Xc(394) is the resultant capacitive reactance of capacitor 394.

Xl(392) is the resultant inductive reactance of inductor 392.

Xin is the resultant open circuit (no load) reactance looking into current-limiting network 328 (before lamp(s) 312 ignite). It is important to note that this is non-zero. In other words, a resonant condition does not exist. Of course, were a resonant condition to exist, an infinite current would result and damage to the components (capacitor 390 and transistors 324 and 326) would result.

Preferably, for driving (as a load 312) the series connection of two F40T12 lamps from a 120 volt AC power line, the following component values are employed:

| Given: | |
|---|---|
| Ein = | 100 volts; |
| Eout = | 450 volts; |
| Rl = | 700 ohms; and |
| Rin = | 250 ohms. |
| Then: | |
| Ein = | 100.0 volts; |
| Eout = | 450.0 volts; |
| Qin = | 1.402004; |
| Qout = | 0.2432048; |
| Rin = | 250.0 ohms; |
| Rl = | 700.0 ohms; |
| Rm = | 741.4040; |
| Xc(390) = | −350.5011 ohms; |
| Xc(394) = | −170.2434 ohms; |

| -continued | |
|---|---|
| Xl(392) = | 450.6442 ohms; and. |
| Xin = | 100.1432 ohms. |

Preferably, inductor 392 is wound on a core of the type which is designated PQ by TDK and which is of the material which is designated H7C1.

The presently preferred embodiment of a gaseous-discharge-lighting system in accordance with the present invention is illustrated in FIG. 4 of the drawing generally designated by the number 400. Gaseous-discharge-lighting system 400 employs a source of high-frequency AC power 402; a current-limiting network 404; and a (load that employs at least one) gaseous discharge lamp 406. Current-limiting network 404 includes a capacitor 410, a transformer 412, and another capacitor 414, all connected in what is referred to herein as a "high-pass" "C-L-X-C" or "T-section" configuration (network). Specifically, capacitor 410 is connected between a high-frequency AC power-source hot line 420, which is connected to high-frequency AC power source 402, and a line 422. Transformer 412 is configured with the primary winding of the transformer connected between line 422 and a high-frequency AC power-source return line 424, which is also connected to high-frequency AC power source 402, and with the secondary winding of the transformer connected between a pair of lines, which are respectively designated 426 and 428. Capacitor 414 is connected between line 426 and a line 430. Finally, load (lamp) 406 is connected between lines 430 and 428.

In one embodiment, transformer 412 has a primary winding reactance which is the same as the reactance of inductor 392 of current-limiting network 328 (shown in FIG. 3), and has a turns ratio of 1:1. As a consequence, transformer 412 functions as the combination of an inductor (392) and an "ideal" transformer. Thus, current-limiting network 406 is, functionally, quite similar to current-limiting network 328. Like current-limiting network 328, current-limiting network 404 is, also, operative to provide an impedance transformation, providing a relatively high impedance to lamp 406 while providing a relatively low impedance at, or near, a zero degree phase angle, to high-frequency AC power source 402, reducing the level of the current through the transistors. Further, current-limiting network 404 is useful in that it may provide an increased starting potential across lamp 406. However, unlike current-limiting network 328, current-limiting network 404 is, in addition, operative to provide greater isolation (safety) and an extra degree of design freedom.

Preferably, the components of current-limiting network 404 have component values calculated in accordance with the following formulas:

| | |
|---|---|
| Nsp = | $(Rl/Rpri)^{\frac{1}{2}}$; |
| Epri = | Eout/Ein/Nsp; |
| Rm = | $(Epri^2 * Rin * (Rin + Rpri) - 2 * Epri * Rin * Rpri)/((Epri^2 * Rin) - Rpri)$; |
| Rpri > | Rin; |
| Qin = | $((Rm/Rin) - 1)^{\frac{1}{2}}$; |
| Qout = | $((Rm/Rpri) - 1)^{\frac{1}{2}}$; |
| Xc(410) = | −Qin * Rin; |
| Xlp(412) = | Rm/(Qin + Qout); |
| Xc(414) = | −Qout * Rl; |
| Xin = | Xlp(412) + Xc(410); and, |
| Eoact = | Ein * Xlp(412) * Nsp/Xin. | where:

Ein is the RMS output voltage level which is developed by high-frequency AC power-source 400 (between lines 420 and 424).

Eout is the desired RMS open-circuit output voltage level which is to be developed across load (lamp(s)) 406 (between lines 430 and 428) before the lamp(s) ignite.

Rl is the loaded lamp impedance.

Rin is the input impedance which is to be presented by current-limiting network 404 to high-frequency AC power-source 400 (between lines 420 and 424) to yield the desired lamp power level.

Rm is a dependent variable, a unique solution for which is defined by the above equations given Ein, Eout, Rl, Rin, and Rpri.

Qin is the resultant loaded L-section input Q presented by current-limiting network 404 to high-frequency AC power-source 400 (between lines 420 and 424). It should be noted that for the embodiment of current-limiting network (404) shown in FIG. 4, independent control of the input Q is now available.

Qout is the resultant loaded L-section output Q presented by current-limiting network 404 to lamp(s) 406 (between lines 430 and 428).

Xc(410) is the resultant capacitive reactance of capacitor 410.

Xc(414) is the resultant capacitive reactance of capacitor 414.

Xlp(412) is the resultant inductive reactance of the primary of transformer 412.

Xin is the resultant open circuit (no load) reactance looking into current-limiting network 404 (before lamp(s) 406 ignite). It is important to note that this is non-zero. In other words, a resonant condition does not exist. Of course, were a resonant condition to exist, an infinite current would result, the core of transformer 412 would saturate and damage to the components would result.

Nsp is the turns ratio (secondary-to-primary) of transformer 412.

Rpri is the impedance at the transformer primary. Rpri is a new independent variable, employed to establish Qin. Rpri must be greater than Rin.

Epri is a voltage ratio.

Eoact is the actual RMS open-circuit output voltage level which is to be developed across load (lamp(s)) 406 (between lines 430 and 428) before the lamp(s) ignite. Eoact, when checked against Eout, provides a means of ascertaining when certain boundary conditions have been exceeded.

Preferably, for driving (as a load 312) the series connection of two F40T12 lamps from a 120 volt AC power line, the following component values are employed:

```
            Given:
    Ein  =  100 volts;
    Eout =  450 volts;
    Rl   =  700 ohms;
    Rin  =  250 ohms; and
    Rpri =  1000;
            Then:
    Ein   = 100.0 volts;
    Eoact = 450.0 volts;
    Eout  = 450.0 volts;
    Epri  = 5.378529;
    Nsp   = 0.836660;
    Qin   = 1.753919;
    Qout  = 0.138050;
```

```
            -continued
    Rin     = 250.0 ohms;
    Rl      = 700.0 ohms..
    Rm      = 1019.1 ohms;
    Rpri    = 1000.0 ohms;
    Xc(410) = −438.4797 ohms;
    Xc(414) = −96.63516 ohms;
    Xin     = 108.1432 ohms; and,
    Xlp(412)= 538.6623 ohms.
```

Preferably, transformer 412 is wound on a core of the type which is designated PQ by TDK and which is of the material which is designated H7C1. Wound on the core is 112 turns of heavy Nylon-Polyester insulated 27 gauge wire for the transformer primary and 100 turns of heavy Nylon-Polyester insulated 30 gauge wire for the transformer secondary.

Figure 5:
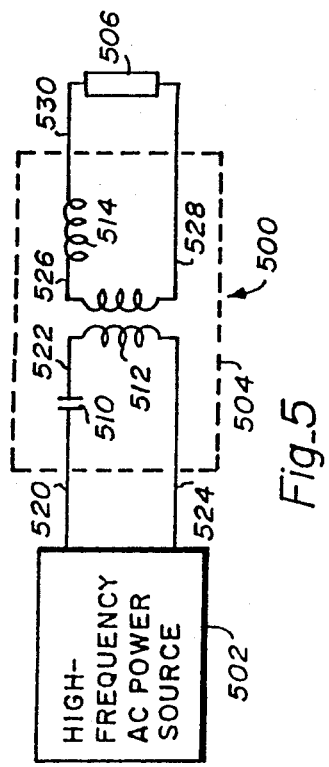
FIG. 5 is a schematic diagram of a high lamp impedance variation of the gaseous-discharge-lighting system shown in FIG. 4.

Unfortunately, mathematical "boundary conditions" impose certain limitations on the range of component values (generally, and on the maximum lamp impedance in particular) which may be "realized." To provide "realizable" solutions in these cases, a small inductor is substituted for capacitor 414 (shown in FIG. 4). More specifically, this embodiment of a gaseous-discharge-lighting system in accordance with the present invention is illustrated in FIG. 5 of the drawing generally designated by the number 500. Gaseous-discharge-lighting system 500 employs a source of high-frequency AC power 502; a current-limiting network 504; and a (load that employs at least one) gaseous discharge lamp 506. Current-limiting network 504 includes a capacitor 510 a transformer 512, and a inductor 514, all connected in what is referred to herein as a "high-pass" "C-L-X-L" configuration (network). Specifically, capacitor 510 is connected between a high-frequency AC power-source hot line 520, which is connected to high-frequency AC power source 502, and a line 522. Transformer 512 is configured with the primary winding of the transformer connected between line 522 and a high-frequency AC power-source return line 524, which is also connected to high-frequency AC power source 502, and with the secondary winding of the transformer connected between a pair of lines, which are respectively designated 526 and 528. Inductor 514 is connected between line 526 and a line 530. Finally, load (lamp) 506 is connected between lines 530 and 528.

Like current-limiting network 404, current-limiting network 504 is operative to provide an impedance transformation, providing a relatively high impedance to lamp 506 while providing a relatively low impedance at, or near, a zero degree phase angle, to high-frequency AC power source 502, reducing the level of the current flowing through the transistors. Further, like current-limiting network 404, current-limiting network 504 is useful in that it may provide an increased starting potential across lamp 506. In addition, like current-limiting network 404, current-limiting network 504 is operative to provide greater isolation (safety) and an extra degree of design freedom.

Preferably, the components of current-limiting network 504 have component values calculated in accordance with the following formulas:

```
    Nsp  = (R1/Rpri)^{1/2};
    Epri = Eout/Ein/Nsp;
    Rm   = (Epri^2 * Rin * (Rin + Rpri) − 2 * Epri *
           Rin * Rpri)/((Epri^2 * Rin) − Rpri);
    Rpri > Rin;
```

-continued $$Qin = ((Rm/Rin) - 1)^{\frac{1}{2}};$$
$$Qout = ((Rm/Rpri) - 1)^{\frac{1}{2}};$$
$$Xc(510) = Qin * Rin;$$
$$Xlp(512) = Rm/(Qin + Qout);$$
$$Xl(514) = Qout * Rl;$$
$$Xin = Xlp(512) + Xc(510); \text{ and.}$$
$$Eoact = Ein * Xlp(512) * Nsp/Xin.$$

Where:

Ein is the RMS output voltage level which is developed by high-frequency AC power-source 500 (between lines 520 and 524).

Eout is the desired RMS open-circuit output voltage level which is to be developed across load (lamp(s)) 506 (between lines 530 and 528) before the lamp(s) ignite.

Rl is the loaded lamp impedance.

Rin is the input impedance which is to be presented by current-limiting network 504 to high-frequency AC power-source 500 (between lines 520 and 524) to yield the desired lamp power level.

Rm is a dependent variable, a unique solution for which is defined by the above equations given Ein, Eout, Rl, Rin, and Rpri.

Qin is the resultant loaded L-section input Q presented by current-limiting network 504 to high-frequency AC power-source 500 (between lines 520 and 524). It should be noted that for the embodiment of current-limiting network (504) shown in FIG. 5, independent control of the input Q is now available.

Qout is the resultant loaded L-section output Q presented by current-limiting network 504 to lamp(s) 506 (between lines 530 and 528).

Xc(510) is the resultant capacitive reactance of capacitor 510.

Xl(514) is the resultant inductive reactance of inductor 514.

Xlp(512) is the resultant inductive reactance of the primary of transformer 512.

Xin is the resultant open circuit (no load) reactance looking into current-limiting network 504 (before lamp(s) 506 ignite). It is important to note that this is non-zero. In other words, a resonant condition does not exist. Of course, were a resonant condition to exist, an infinite current would result, the core of transformer 512 would saturate and damage to the components would result.

Nsp is the turns ratio (secondary-to-primary) of transformer 512.

Rpri is the transformer impedance. Rpri is a new independent variable, employed to establish Qin. Rpri must be greater than Rin.

Epri is a voltage ratio.

Eoact is the actual RMS open-circuit output voltage level which is to be developed across load (lamp(s)) 506 (between lines 530 and 528) before the lamp(s) ignite. Eoact, when checked against Eout, provides a means of ascertaining when certain boundary conditions have been exceeded.

Preferably, for driving (as a load 506) the series connection of two F40T12 lamps from a 120 volt AC power line, the following component values are employed:

| Given: |
| --- |
| Ein = 100 volts; |
| Eout = 450 volts; |

-continued

| | |
| --- | --- |
| Rl = | 700 ohms; |
| Rin = | 250 ohms; and |
| Rpri = | 2800; |
| Then: | |
| Ein = | 100.0 volts; |
| Eoact = | 450.0 volts; |
| Eout = | 450.0 volts; |
| Epri = | 9.000; |
| Nsp = | 0.500000; |
| Qin = | 3.204581; |
| Qout = | 0.078684; |
| Rin = | 250.0 ohms; |
| Rl = | 700.0 ohms; |
| Rm = | 2817.3 ohms; |
| Rpri = | 2800.0 ohms; |
| Xc(510) = | −801.15 ohms; |
| Xl(514) = | 55.08 ohms; |
| Xin = | 100.1432 ohms; and. |
| Xlp(512) = | 901.2885 ohms. |

Preferably, transformer 512 is wound on a core of the type which is designated PQ by TDK and which is of the material which is designated H7C1. Wound on the core is 173 turns of heavy Nylon-Polyester insulated 28 gauge wire for the transformer primary and 100 turns of heavy Nylon-Polyester insulated 30 gauge wire for the transformer secondary.

Of course, for maximum efficiency, it is important that the loaded Q of the above-mentioned current-limiting networks be as low as possible (since the efficiency of such a network is equal to the quantity one minus the loaded (running) Q of the network (the sum of all of the individual (component) Qs of the network) all divided by the unloaded Q of the network (the sum of all of the individual (component) Qs of the network.) However, when driven by a high-frequency AC power-source having a square-type waveform, such networks may couple to the lamp(s) certain "spikes" (square-wave edges). Such spikes may exceed the "crest factor" (peak to RMS potential level) limitations of the lamp(s) or cause certain undesirable interactions of the negative resistance of the lamp(s) and the network. Thus, in certain embodiments of lighting systems in accordance with the present invention, "Q enhancing" elements are included in the associated current-limiting networks.

Figure 6B:
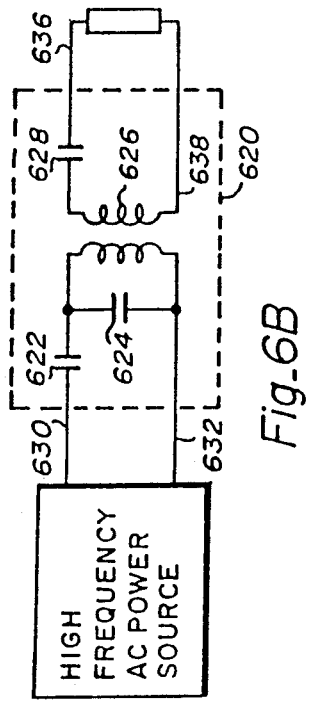
Figure 6D:
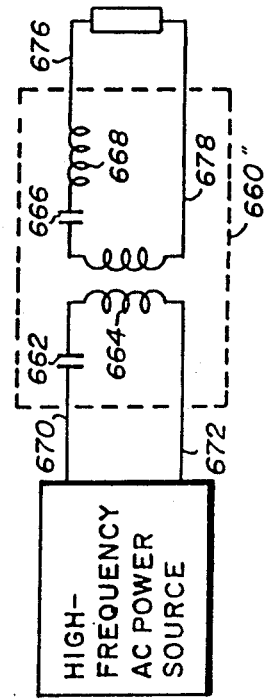
Figure 6A:
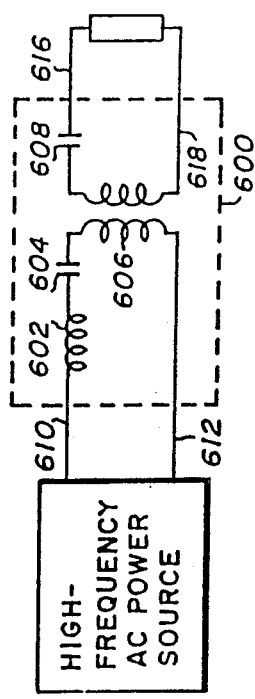

Specifically, in FIG. 6A, "an input Q-enhanced" current-limiting network is illustrated generally designated 600. Current-limiting network 600 includes a "Q-enhancing" inductor 602, a capacitor 604, a transformer 606, and another capacitor 608. The primary of transformer 606 is connected in series with inductor 602 and capacitor 604 between a pair of current-limiting network 600 input lines 610 and 612; and, the secondary of the transformer is connected in series with capacitor 608 between a pair of current-limiting network 600 output lines 616 and 618.

In FIG. 6B, "a transformer primary Q-enhanced" current-limiting network is illustrated generally designated 620. Current-limiting network 620 includes a capacitor 622, a "Q-enhancing" capacitor 624, a transformer 626, and another capacitor 628. The primary of transformer 626 is connected in series with capacitor 622 between a pair of current-limiting network 620 input lines 630 and 632; and, the secondary of the transformer is connected in series with capacitor 628 between a pair of current-limiting network 620 output lines 636 and 638. Capacitor 624 is connected in parallel with the primary winding of transformer 626.

Figure 6C:
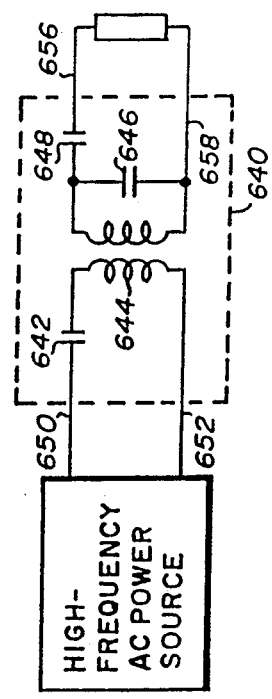

"A transformer secondary Q-enhanced" current-limiting network is illustrated in FIG. 6C, generally designated 640. Current-limiting network 640 includes a capacitor 642, a transformer 644, a "Q-enhancing" capacitor 646, and another capacitor 648. The primary of transformer 644 is connected in series with capacitor 642 between a pair of current-limiting network 640 input lines 650 and 652; and, the secondary of the transformer is connected in series with capacitor 648 between a pair of current-limiting network 640 output lines 656 and 658. Capacitor 644 is connected in parallel with the secondary winding of transformer 646.

Finally, in FIG. 6D, "an output Q-enhanced" current-limiting network is illustrated generally designated 660. Current-limiting network 660 includes a capacitor 662, a transformer 664, another capacitor 666 and a "Q-enhancing" inductor 668. The primary of transformer 664 is connected in series with capacitor 662 between a pair of current-limiting network 660 input lines 670 and 672; and, the secondary of the transformer is connected in series with capacitor 666 and inductor 668 between a pair of current-limiting network 660 output lines 676 and 678.

In addition to their use for "Q-enhancement," the added inductor (inductor 602 for current-limiting network 600, illustrated in FIG. 6D, and inductor 668 for current-limiting network 660, illustrated in FIG. 6D) are useful for current-level sampling. In other embodiments, a small current-sampling transformer is substituted for the extra inductor.

A disadvantage of many lighting systems in which multiple lamps are connected in series is that when one lamp fails, all of the lamps "go out." Illustrated in FIG. 7 of the drawing generally designated by the number 700 is an embodiment of a current-limiting network in accordance with the present invention configured to drive the parallel combination of multiple gaseous discharge (fluorescent) lamps. Specifically, current-limiting network 700 is shown to include a capacitor 702, a transformer 704, and an inductor 706. The primary of transformer 704 is connected in series with capacitor 702 between a pair of current-limiting network 700 input lines 710 and 712; and, the secondary of the transformer is connected in series with inductor 706 between a pair of lines 716 and 718. In addition, current-limiting network 700 is shown to include four, additional, capacitors, respectively designated 720, 722, 724, and 726. Capacitor 720 is connected in series with a lamp 730 between lines 716 and 718. Similarly, capacitor 722 is connected in series with a lamp 732 between lines 716 and 718. A lamp 734 is coupled by capacitor 724 between lines 716 and 718; and, also connected between the lines, is the series combination of capacitor 726 and a lamp 736.

In another embodiment, a capacitor is substituted for inductor 706 and inductors are substituted, one for each of capacitors 720, 722, 724, and 726.

Also, to avoid the "one-out-all-out" problem, illustrated in FIG. 8 of the drawing generally designated by the number 800 is an embodiment of a current-limiting network in accordance with the present invention configured to drive a "quasi-parallel" combination of multiple gaseous discharge (fluorescent) lamps. Specifically, current-limiting network 800 is shown to include an a capacitor 802, a transformer 804, another capacitor 806, and yet four additional capacitors, all connected in what is referred to herein as a "high-pass" "C-L-X-PI" configuration (network). The primary of transformer 804 is connected in series with capacitor 802 between a pair of current-limiting network 800 input lines 810 and 812; and, the secondary of the transformer is connected in series with capacitor 806 between a pair of lines 816 and 818. The four additional capacitors, which are respectively designated 820, 822, 824, and 826, are connected in series between lines 816 and 818. The four additional capacitors are each connected in parallel with a corresponding one of four lamps, which are respectively designated 830, 832, 834, and 836. More specifically, capacitor 820 is connected in parallel with lamp 830 between line 816 and a line 840; capacitor 822 is connected in parallel with lamp 832 between line 840 and a line 842; capacitor 824 is connected in parallel with lamp 834 between line 842 and a line 844; and, capacitor 826 is connected in parallel with lamp 836 between lines 844 and 818.

Preferably, the components of current-limiting network 800 have component values calculated in accordance with the following formulas:

$$\begin{aligned}
Xc(total) &= Xc(830) + Xc(832) + Xc(834) + Xc(836); \\
X1s(804) &= Rsec/Qout; \\
Xc(806) &= -((Rsec * Qout) + (Rsec * R1/Xc(total))/ \\
&\quad (Qout^2 + 1); \\
Xc(total) &= -R1/((R1 * (Qout^2 + 1)/Rsec) - 1)^{\frac{1}{2}}; \\
Rpri &= Rsec/N^2 \\
Xs(804) &= X1s(804) * (Xc(806) + Xc(total)/ \\
&\quad X1s(804) + Xc(806) + Xc(total)); \\
Eout &= Epri * N * Xc(total)/(Xc(806) + Xc(total)); \\
Qin &= ((Rpri/Rin) - 1)^{\frac{1}{2}}; \\
Xc(802) &= -Rin * Qin; \\
X1(804) &= Rpri/Qin; \\
Epri &= ((Ein * X1(804) * Xs(804)/N^2)/ \\
&\quad (X1(804) + Xs(804)/N^2))/Xin; \\
X1p(804) &= (X1(804 * X1s(804)/N^2)/ \\
&\quad (X1(804) + X1s(804)/N^2) \\
Xin &= Xc(802) + ((X1(804) * Xs(804)/N^2)/ \\
&\quad (X1(804) + Xs(804)/N^2))
\end{aligned}$$

Where:

Ein is the RMS output voltage level which is developed by the high-frequency AC power-source (between lines 810 and 812).

Eout is the desired RMS open-circuit output voltage level which is to be developed across load (lamp(s)) 830, 832, 834, and 836 (between lines 816 and 818) before the lamp(s) ignite.

R1 is the loaded lamp impedance.

Rin is the input impedance which is to be presented by current-limiting network 800 to the high-frequency AC power-source (between lines 810 and 812) to yield the desired lamp power level.

Qin is the resultant loaded L-section input Q presented by current-limiting network 800 to the high-frequency AC power-source (between lines 816 and 818).

Qout is the resultant loaded PI-section output Q presented by current-limiting network 800 to lamp(s) 830, 832, 834, and 836 (between lines 816 and 818).

Xc(802) is the resultant capacitive reactance of capacitor 802.

Xc(806) is the resultant capacitive reactance of capacitor 806.

Xc(820) is the resultant capacitive reactance of capacitor 820.

Xc(822) is the resultant capacitive reactance of capacitor 822.

Xc(824) is the resultant capacitive reactance of capacitor 824.

Xc(826) is the resultant capacitive reactance of capacitor 826.

Xls(804) is the required inductive reactance for the secondary of transformer 804, neglecting the primary.

Xl(804) is the required inductive reactance for the primary of transformer 804, neglecting the secondary.

Xlp(804) is the resultant inductive reactance for the primary of transformer 804.

Xin is the resultant open circuit (no load) reactance looking into current-limiting network 800 (before lamp(s) 830, 832, 834, and 836 ignite). It is important to note that this is non-zero. In other words, a resonant condition does not exist. Of course, were a resonant condition to exist, an infinite current would result, the core of transformer 804 would saturate and damage to the components would result.

N is the turns ratio (primary-to-secondary) of transformer 804.

Rpri is the transformer impedance. Rpri must be greater than Rin.

Epri is a voltage ratio.

Preferably, for driving the series connection of four F032T8 lamps from a 120 volt AC power line, the following component values are employed:

| Given: | |
|---|---|
| Ein = | 105 volts; |
| Eout = | 1400 volts; |
| R1 = | 2600 ohms; |
| Rin = | 130 ohms; and |
| Qout = | 2.5; |
| Then: | |
| Eout = | 1400.0 volts; |
| Epri = | 266.9231; |
| N = | 9.440920; |
| Qin = | 0.549050; |
| Rin = | 130.0 ohms; |
| R1 = | 2600.0 ohms; |
| Rpri = | 169.1892 ohms; |
| Rsec = | 15080.00 ohms; |
| Xc(802) = | −71.37647 ohms; |
| Xc(806) = | −4160.000 ohms; |
| Xc(total) = | −5200.000 ohms; |
| Xin = | 46.28448 ohms; |
| Xl(804) = | 308.1492 ohms; |
| Xlp(804) = | 55.48917 ohms; |
| Xls(804) = | 6032.000 ohms; and |
| Xs(804) = | 16965.00 ohms. |

Preferably, transformer 512 is wound on a core of the type which is designated PQ by TDK and which is of the material which is designated H7C1.

In another embodiment, an inductor is substituted for capacitor 806. In yet another embodiment, inductors are substituted, one for each of capacitors 820, 822, 824, and 826.

In a presently preferred embodiment, illustrated in FIG. 9, used is a combination of the lighting systems shown in FIGS. 7 and 8.

Although lighting systems in accordance with the present invention may use a simple square-wave-type high-frequency AC power source, the "Electronic Ballast For Gaseous Discharge Lamps" which is disclosed in the above-mentioned U.S. Pat. No. 4,415,839 of Ronald A. Lesea uses a modified square-wave-type source (having dead time between pulses), the frequency and/or pulse width of which is varied so as to control the level of the power delivered to the load (lamps). Not only are the current-limiting networks disclosed herein compatible with such a high-frequency AC power source, but the networks are suitable for use with high-frequency AC power sources which develop other type waveforms including sinusoidal, rectangular, pulse, square, modified square with dead time, and triangular. Also, not only are the current-limiting networks disclosed herein compatible with high-frequency AC power sources (such as those disclosed in the above-mentioned U.S. Pat. No. 4,415,839 of Ronald A. Lesea) which appear to the network as voltage sources (high-frequency AC power sources which appear to their respective network as having a relatively low impedance, as illustrated in FIG. 10A, designated 900), but they are compatible with high-frequency AC power sources which appear to the network as current sources (high-frequency AC power sources which appear to their respective network as having a relatively high impedance, as illustrated in FIG. 10B, designated 910). (Of course, when the current-limiting network is driven by a high-frequency AC power sources which appear to the network as a current source, Rin is equal to the value representing the desired lamp power divided by the square of the value representing the level of the current delivered to the network by the source.)

It is contemplated that after having read the preceding disclosure, certain alterations and modifications of the present invention will no doubt become apparent to those skilled in the art. It is therefor intended that the following claims be interpreted to cover all such alterations and modifications as fall within the true spirit and scope of the invention.

What is claimed is:

1. A lighting system comprising in combination:
   a high-frequency AC power source (502);
   a load (506) including at least one gaseous discharge lamp; and
   a current-limiting network (504) including,
      capacitor means (510) having a predetermined capacitive reactance,
      inductor means (514) having a predetermined inductive reactance the magnitude of which is less than the magnitude of said capacitive reactance, and
      transformer means (512) having primary winding means coupled in series with said capacitor means across said high-frequency AC power source and secondary winding means coupled in series with said inductor means across said load.

2. A lighting system as recited in claim 1 wherein said high-frequency AC power source appears to said current-limiting network as a voltage source.

3. A lighting system as recited in claim 1 wherein said high-frequency AC power source appears to said current-limiting network as a current source.

4. A lighting system comprising in combination:
   a high frequency AC power source (502);
   a load (506) including a least one gaseous discharge lamp; and
   a current-limiting network (504) including,
      capacitor means (510) having a predetermined capacitive reactance Xc(1),
      inductor means (514) having a predetermined inductive reactance Xl(1),
      transformer means (512) having primary winding means coupled in series with said capacitor means across said high-frequency AC power source and secondary winding means coupled in series with said inductor means across said load, said primary winding means having a predetermined inductive reactance Xlp(1), said transformer means having a transformer impedance Rpri, wherein Xc(1), Xlp(1), Xl(1), and Rpri conform to the relationship:

$$Rm = ((Eout/Ein/((Rl/Rpri)^{\frac{1}{2}}))^2 * Rin * (Rin + Rpri) - 2 * (Eout/Ein/((Rl/Rpri)^{\frac{1}{2}})) * Rin * Rpri/(((Eout/Ein/((Rl/Rpri)^{\frac{1}{2}}))^2 * Rin) - Rpri);$$
$$Xc(1) = -Rin * ((Rm/Rin) - 1)^{\frac{1}{2}};$$
$$Xlp(1) = Rm/(((Rm/Rpri) - 1)^{\frac{1}{2}} - ((Rm/Rin) - 1)^{\frac{1}{2}});$$
$$Xl(1) = Rl * ((Rm/Rpri) - 1)^{\frac{1}{2}};$$

Where:

Rl is a predetermined loaded lamp impedance presented to said current-limiting network by said load;

Rin is a predetermined input impedance presented by said current-limiting network to said high-frequency AC power-source;

Eout is a predetermined open-circuit output voltage level developed by said current-limiting network across said load;

Ein is a predetermined voltage level developed by said high-frequency AC power-source across Rin; and Rm is a dependent variable, which is defined by Ein, Eout, Rl, Rin, and Rpri.

* * * * *